Oct. 16, 1928.
I. E. ROSHOLT
1,688,206
ENSILAGE HARVESTER WITH CORN SHELLING DEVICE
Filed Jan. 30, 1924    3 Sheets-Sheet 1
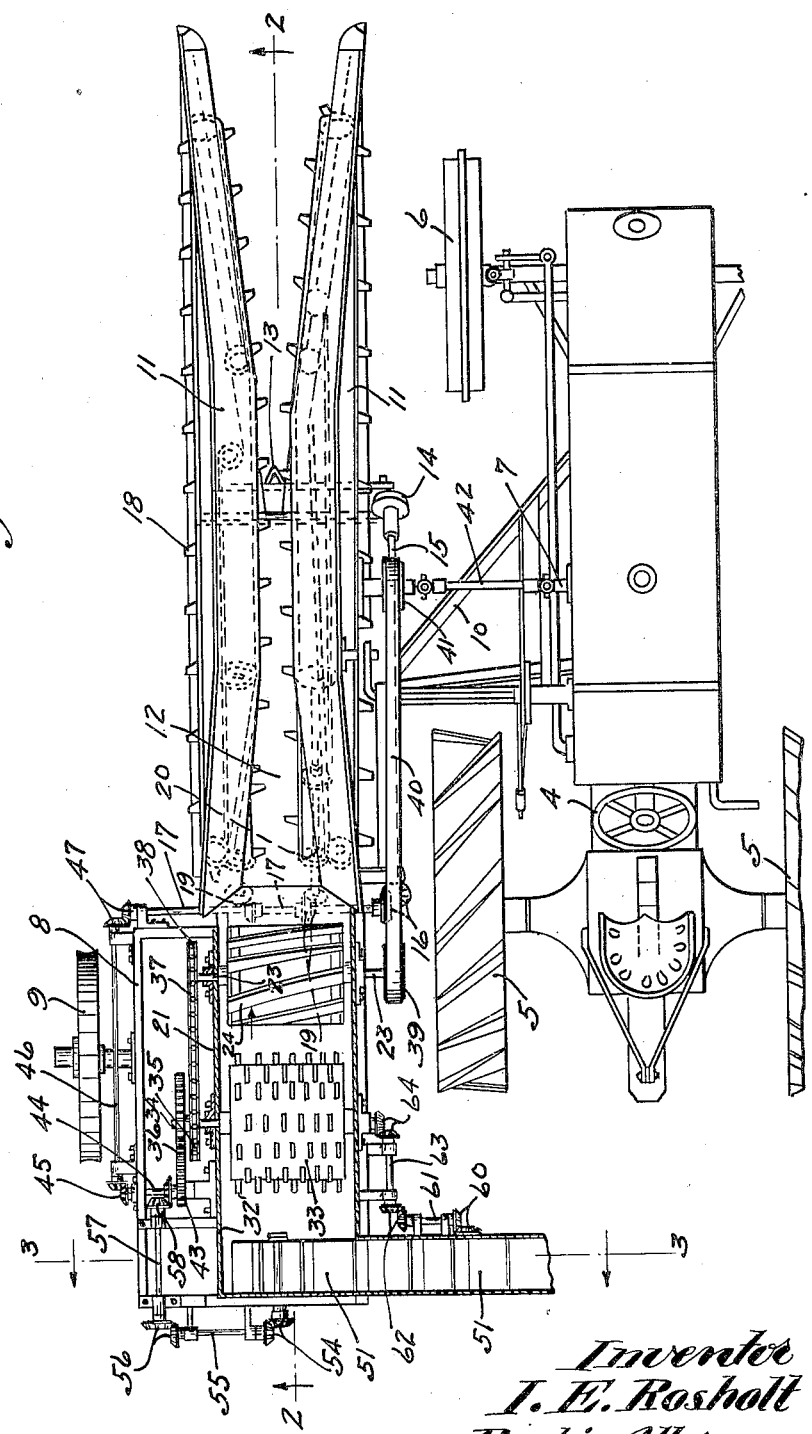
Inventor
I. E. Rosholt
By his Attorneys
Merchant & Kilgore

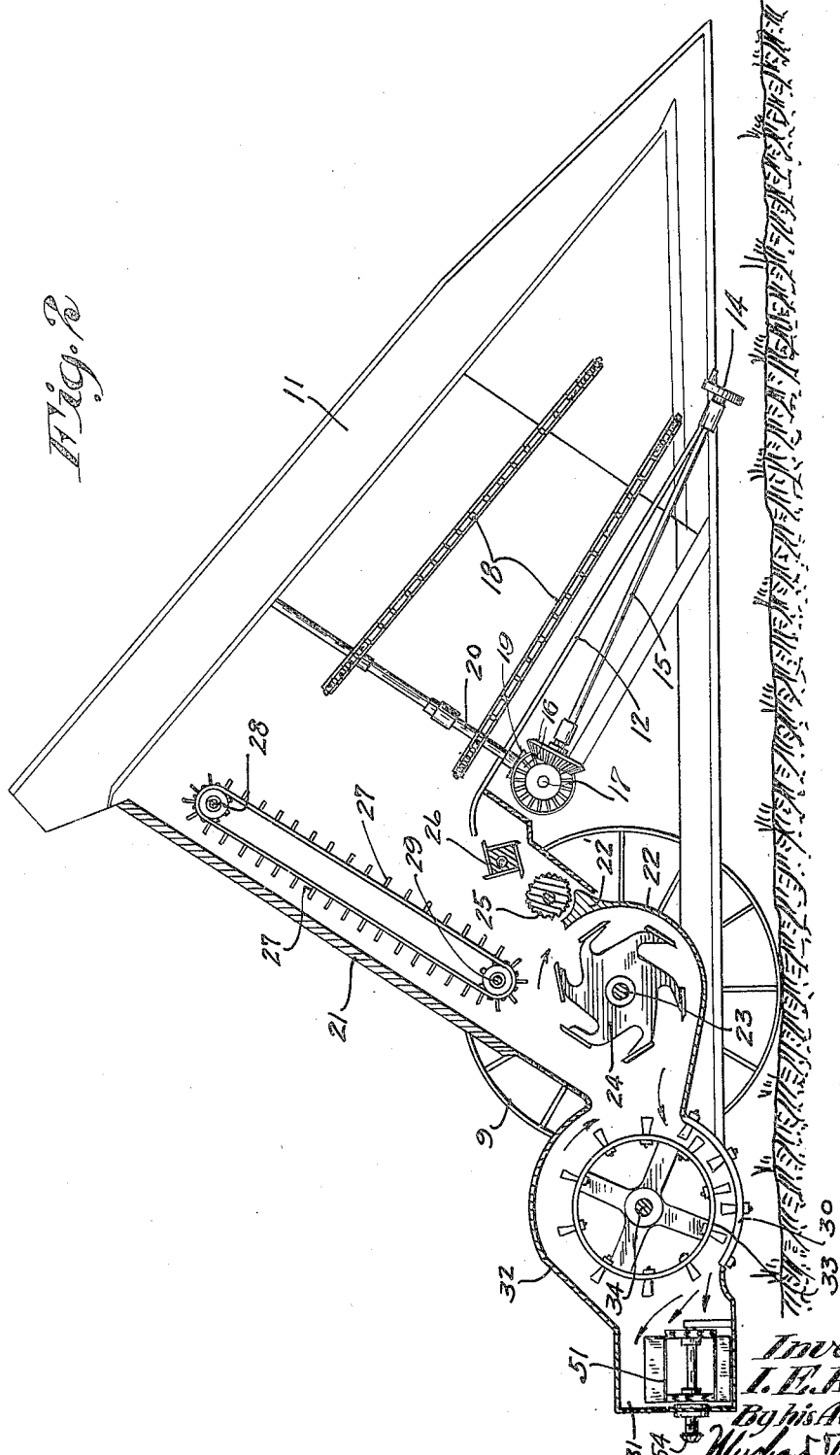

Oct. 16, 1928.
I. E. ROSHOLT
1,688,206
ENSILAGE HARVESTER WITH CORN SHELLING DEVICE
Filed Jan. 30, 1924 3 Sheets-Sheet 3
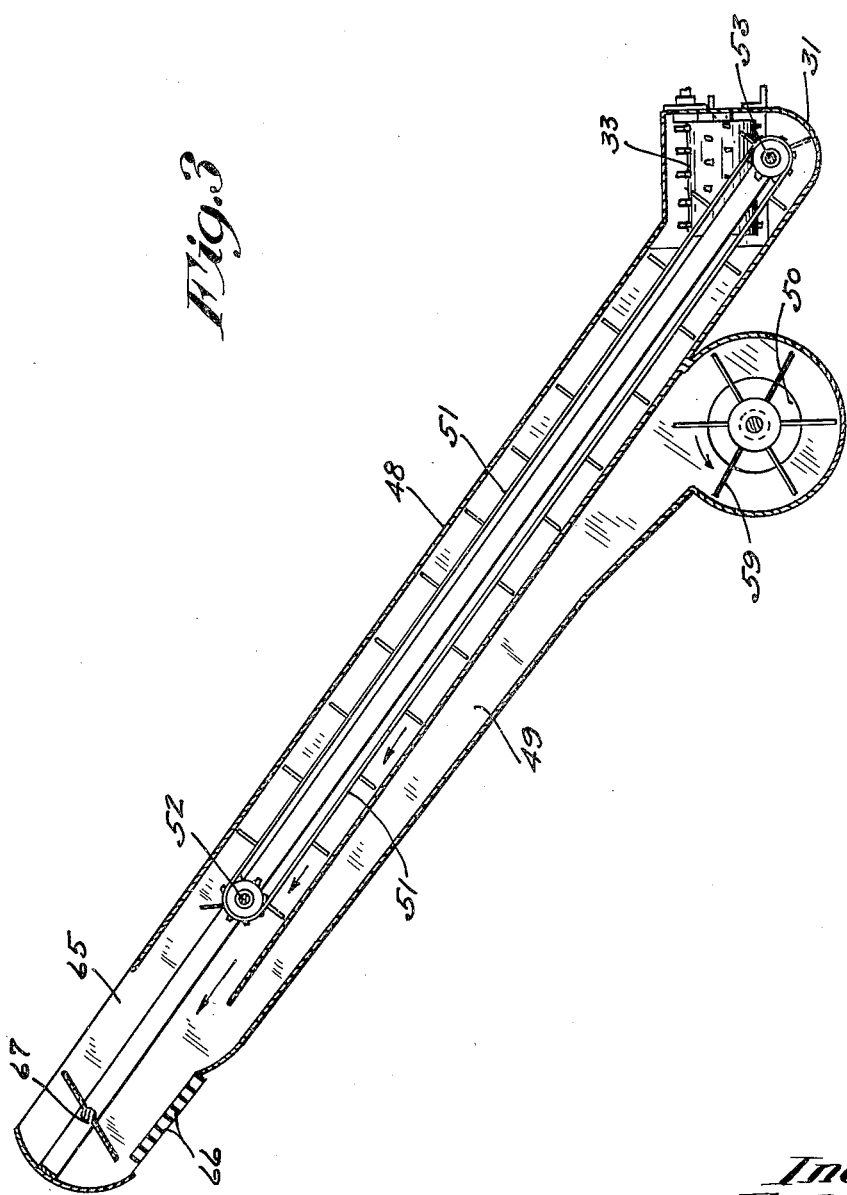

Patented Oct. 16, 1928.

1,688,206

UNITED STATES PATENT OFFICE.

INGELBERT E. ROSHOLT, OF MINNEAPOLIS, MINNESOTA.

ENSILAGE HARVESTER WITH CORN-SHELLING DEVICE.

Application filed January 30, 1924. Serial No. 689,576.

My invention relates to what is generally designated as an ensilage harvester and is especially designed as an improvement on or an addition to that type of ensilage harvester known to the trade as the "Ronning", and the late form of which is disclosed and claimed in a pending application of Andrean G. Ronning and Adolph Ronning, Serial No. 657,176, filed of date August 13, 1923.

The particular object of the present invention is to provide, in connection with such ensilage harvesters, means whereby, by operations performed in the traveling harvester, the corn stalks and ears may be cut up into ensilage, the corn shelled from the cobs or cob nubbins, and the shelled corn separated from the ensilage proper.

This machine, with shelling device or attachment, will be especially serviceable where it is the practice to let the corn ripen on the stalks, to shell and save only the corn and to throw the dry ensilage, which does not have much food value, back on the ground to be plowed under and used as fertilizer.

The invention is illustrated in the accompanying drawings, wherein like characters indicate like parts throughout the several views.

Referring to the drawings:

Fig. 1 is a plan view illustrating my invention incorporated in an ensilage harvester of the type disclosed in said Ronning application and connected to a tractor such as a Fordson tractor, some parts being in section and some parts being broken away;

Fig. 2 is a vertical section taken approximately on the line 2—2 of Fig. 1, some parts being shown in full; and Fig. 3 is a transverse section on the line 3—3 of Fig. 1.

Of the parts of the Fordson tractor illustrated it is desirable for the purposes of this case only to particularly note the tractor frame 4, the rear traction wheels 5, front steering wheel 6, and the pulley drive shaft 7, which latter is found on all Fordson and many other tractors, and is here utilized to transmit power to the running parts of the ensilage harvester and shelling device.

The ensilage harvester proper is here shown as of the Ronning type such as disclosed in said prior application, and is in the nature of an attachment to the tractor, and which comprises a framework indicated as an entirety by the numeral 8, the rear portion of which is supported by a wheel 9, and the inner side of which is suitably connected to the tractor frame by a trussed bracket 10 or other suitable means which will cause said framework to travel with the tractor. The frame 8 is of light trussed skeleton form and has laterally spaced inwardly projecting gathering frames 11. The rear lower portion of the gathering frames 11 are connected by an inclined deck 12, at the front edge of which is a reciprocating primary stalk cutter in the form of a sickle bar 13 driven from a crank 14 carried by the front end of the shaft 15 mounted in suitable bearings on the inner gathering frame 11. At its rear end, shaft 15 is connected by mitre gears 16 to a transverse shaft 17 journaled on suitable bearings in the frame 8. To carry the stalks rearward in substantially upstanding positions after they have been severed from their roots by the sickle bar 13, tooth-equipped belts 18, such as employed in the Ronning machine, are preferably used and these are mounted to run over suitable guide sprockets on the gathering frames and are arranged to be driven from the cross shaft 17 through bevel gears 19 and sprocket-equipped shafts 20.

The gathering belts 18 deliver the stalks into a housing 21 suitably secured on the frame 8 and provided with a basin-like bottom 22, a portion of which is cylindrical and terminates at its front upper edge in a shelling blade or bar 22'.

Mounted in suitable bearings on the sides of the housing 21 is a shaft 23 that carries a rotary ensilage cutter 24 of the lawn mower type, the blades of which are arranged to cooperate with the shelling bar 22' when rotated in a clockwise direction in respect to Fig. 2. The delivery of the stalks from the gathering belts 18 and off from the rear end of the deck 12 may be facilitated by a feed roller 25 and a shredding roller 26 suitably journaled to the sides of the housing 21 and driven by any suitable means, not necessary for the purposes of this case to consider.

The numeral 27 indicates a feed belt arranged to run over sprocket-equipped shafts 28 and 29 suitably mounted in the housing 21 and driven in any suitable way to facilitate the downward movement of the stalks to the cutter. The elements 26 and 27 are found in the Ronning application above identified and are not here claimed.

The basin-like bottom 22 extends rearward to a toothed concave 30 that is rigidly supported by the frame 8 and in turn extends rearward to an elevator boot 31. A hood 32 overlies the concave 30 and boot 31.

Working within the hood 32 and co-operating with the toothed concave 30 is a toothed thrashing cylinder 33, the shaft 34 of which is journaled in suitable bearings on the sides of the hood 32, and at its outer end is provided with a sprocket 35 and a spur gear 36.

A sprocket chain 37 runs over the sprocket 35 and over a sprocket 38 on the outer end of the cutter shaft 23, and the latter at its inner end has a pulley 39. A power-driven belt 40 runs over the pulley 39 and over a pulley 41 journaled to a suitable bearing on the inner gathering frame 11. This pulley 41 is connected by a joint shaft 42 to the pulley shaft 7 of the tractor, and then the ensilage cutter and thrashing cylinder are driven from the tractor.

As a means for driving the gathering chains from the tractor, the following transmission connections may be used:

Gear 36 engages a spur pinion 43 secured to a shaft 44 journaled to a suitable bearing on the adjacent side of the hood 32; but here it may be noted that the hood 32 constitutes a rear extension of the housing 21. Shaft 44 is connected by mitre gears 45 to a shaft 46 journaled in suitable bearings on the frame 8 and in turn connected by mitre gears 47 to the outer end of the cross shaft 17.

Extended obliquely upward from the elevator boot 31 and transversely of the machine at the rear of the tractor is an enclosed elevator leg 48 and an underlying air delivery stack 49, which latter at its lower end terminates in a fan casing 50. These elements 48 and 49 are suitably supported from the frame 8.

Working in the elevator leg 48 is a slat-equipped elevator belt 51 that runs over an upper sprocket-equipped shaft 52 and under a lower sprocket-equipped shaft 53, which latter is located near the lower portion of the boot 31 and is connected at its rear end by mitre gears 54 to a short transverse shaft 55 journaled in suitable bearings in the rear portion of the frame 8. The shaft 55 is connected by mitre gears 56 to the rear end of a short shaft 57 journaled in suitable bearings on the frame 8 and connected to the shaft 44 by mitre gears 58.

Working in the fan casing 50 is a rotary fan head 59, the shaft of which, at its front end, is connected by mitre gears 60 to a short shaft 61 journaled in suitable bearings on the elevator leg 48. Shaft 61 is connected by mitre gears 62 to a short shaft 63 journaled in suitable bearings on the adjacent side of the hood 32. Shaft 63 is connected by mitre gears 64 to the inner end of the thrashing cylinder shaft 34, (see Fig. 1).

By reference to Fig. 3 it will be noted that the air delivery stack 49 opens into the upper portion of the elevator leg 48 above the uppermost portion of the belt 51, and that the said elevator leg in the top of its upper end is provided with a large discharge passage 65, and below said opening or in the bottom of the stack is provided with a grate or perforated portion 66 through which shelled corn may drop but through which the coarse ensilage cannot pass. Mounted in the extreme upper end of the elevator leg is a pivotally adjustable deflector 67 adapted to be set at any desired angle and to operate as hereinafter described.

Operation.

Briefly summarized, the operation of this machine is substantially as follows:

Under advance movement of the machine, the standing corn stalks will be severed from their roots by the primary cutter 13 and by the gathering belts and gathering frames will be delivered over the deck 12 and from thence, butt ends downward, to the rotary ensilage cutter, and by the latter the stalks and the corn heads will be cut into short sections and more or less of the corn will be shelled from the cob. This commingled material, including the good corn, will be passed rearward and subjected to the action of the thrashing cylinder and concave, and under the action of which all the corn will be shelled from the cobs and all will be delivered rearward into the elevator boot 31 and from thence will be carried upward by the elevator belt 51. As the commingled mass is delivered upward and through the blast from the air stack 49, all of the more bulky and light material will be blown upward and out from the opening 65, and from thence will be thrown onto the ground; but the shelled corn being relatively heavy and less subject to the blast will be precipitated through the grate 66 and may be delivered into a wagon or receptacle driven or carried by the side of the harvester in a position to receive the same. By angular adjustments of the deflector 67, the tendency of the blast to carry off more or less of the cut ensilage may be varied so that the shelled corn will be fairly well cleaned and still no shelled corn will be blown off. The dry ensilage blown out through the opening 65 and falling onto the ground may be readily plowed under and will afford fertilizer. Moreover, by this operation the inconvenience of getting rid of corn stalks lying on the ground is eliminated and the stalks are put in such condition that they may be easily plowed under and will quickly decompose and convert into fertilizer which will not only enrich but loosen up the soil.

It will, of course, be understood that, if desired, receptacles may be provided for independently catching and holding the shelled corn and the ensilage blown out of the stack.

What I claim is:

1. In an ensilage harvester, the combination with an ensilage cutter, of means for cutting the stalks from the ground and delivering the same to the ensilage cutter and a corn sheller receiving the cut stalks from said ensilage cutter, means for separating the shelled corn from the ensilage, and means for causing said several instrumentalities to simultaneously perform their respective functions.

2. In an ensilage harvester, the combination with a primary cutter for severing the stalks from their roots, of an ensilage cutter, a conveyor for deliverying the severed stalks from said primary cutter to said ensilage cutter, a corn sheller receiving the ensilage from said ensilage cutter, a separating device for separating the shelled corn from the ensilage, and means for causing said several instrumentalities to simultaneously perform their respective functions.

3. In an ensilage harvester, the combination with a primary cutter for severing the stalks from their roots, of an ensilage cutter, means for delivering the severed stalks from said primary cutter to said ensilage cutter, a co-operating toothed cylinder and concave receiving the ensilage from said ensilage cutter and operating as a corn sheller, means for separating the shelled corn from the ensilage, and means for causing said several instrumentalities to simultaneously perform their respective functions.

4. In an ensilage harvester, the combination with a primary cutter for severing the stalks from their roots, of an ensilage cutter, means for delivering the severed stalks from said primary cutter to said ensilage cutter, a corn sheller receiving the ensilage from said ensilage cutter, means for separating the shelled corn from the ensilage, said means comprising an elevator leg, a conveyor in said leg, a fan having an air delivery stack delivering to the upper portion of said elevator leg, said elevator leg having a grate in the bottom of its upper portion and an ensilage discharge opening above said grate, and means for causing said several instrumentalities to simultaneously perform their respective functions.

5. In an ensilage harvester, the combination with a primary cutter for severing the stalks from their roots, of an ensilage cutter, means for delivering the severed stalks from said primary cutter to said ensilage cutter, a co-operating toothed cylinder and concave receiving the ensilage from said ensilage cutter and operating as a corn sheller, means for separating the shelled corn from the ensilage said means comprising an elevator leg, a conveyor in said leg, a fan having an air delivery stack delivering to the upper portion of said elevator leg, said elevator leg having a grate in the bottom of its upper portion and an ensilage discharge opening above said grate, and means for causing said several instrumentalities to simultaneously perform their respective functions.

6. The structure defined in claim 4 in further combination with an angularly adjustable deflector in the extreme upper portion of said leg.

7. The structure defined in claim 5 in further combination with an angularly adjustable deflector in the extreme upper portion of said leg.

8. In an ensilage harvester, the combination with a primary cutter for severing the stalks from their roots, of an ensilage cutter, means for delivering the severed stalks from said primary cutter to said ensilage cutter, a corn sheller receiving the ensilage from said ensilage cutter, and means for separating the shelled corn from the ensilage, said means comprising an elevator leg, a conveyor in said leg, a fan having an air delivery stack delivering to the upper portion of said elevator leg, said leg at its delivery end having means for the separation of the shelled corn from the ensilage.

In testimony whereof I affix my signature.

INGELBERT E. ROSHOLT.